United States Patent
Nozawa et al.

(10) Patent No.: US 6,749,823 B2
(45) Date of Patent: Jun. 15, 2004

(54) METHOD FOR PRODUCING HYDROPHOBIC SILICA FINE POWDER

(75) Inventors: Yasuaki Nozawa, Annaka (JP); Kiyoshi Shirasuna, Annaka (JP); Masanori Akiyama, Annaka (JP); Takayuki Matsuzawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 321 days.

(21) Appl. No.: 09/941,742

(22) Filed: Aug. 30, 2001

(65) Prior Publication Data

US 2002/0025289 A1 Feb. 28, 2002

(30) Foreign Application Priority Data

Aug. 31, 2000 (JP) .......................................... 2000-262219

(51) Int. Cl.$^7$ ............................................... C01B 33/12
(52) U.S. Cl. ........................................................ 423/337
(58) Field of Search ............................... 423/337, 335, 423/342

(56) References Cited

U.S. PATENT DOCUMENTS 3,924,029 A    12/1975  Schutte et al.
5,458,916 A    10/1995  Kratel et al.

FOREIGN PATENT DOCUMENTS

EP    0 579 049 A1    1/1994

*Primary Examiner*—Stanley S. Silverman
*Assistant Examiner*—Edward M. Johnson
(74) *Attorney, Agent, or Firm*—Birch, Stewart, Kolasch & Birch, LLP

(57) ABSTRACT

Hydrophobic silica fine powder is produced by pyrolyzing a silane compound to form a silica fine powder and hydrophobizing the silica fine powder with an organohalosilane in a fluidization vessel. Hydrophobized silica fine powder which flies out of the fluidization vessel is collected with a cyclone and bag filter which are held at a temperature of 100–500° C. An apparatus for carrying out the process is also provided. Under simple controlled conditions that involve holding the cyclone and bag filter for recovering fugitive silica from the fluidization vessel to temperatures of 100–500° C., the method and apparatus are able to recover essentially 100% of fugitive silica, thus increasing yield of the product and alleviating the burden on waste gas treatment.

2 Claims, 2 Drawing Sheets

METHOD FOR PRODUCING HYDROPHOBIC SILICA FINE POWDER

BACKGROUND OF THE INVENTION

1. Field of the Invention

The present invention relates to a method and apparatus for producing hydrophobic silica fine powder which can be used as a thickener for coatings, adhesives and synthetic resins, as a reinforcement for plastics, and to improve flowability in toners for copiers.

2. Prior Art

Pyrogenic silica (silicon dioxide) is very fine, having a particle size of about 5 to 50 nm. Because it is difficult to collect in this form, it is agglomerated, then collected. The agglomerated silica contains a high concentration of chlorine, and must therefore be deacidified. Deacidification is generally carried out in a fluidization vessel. When agglomerated silica is deacidified, only a small amount of silica flies out of the fluidization vessel together with waste gases. However, when the silica is treated with a hydrophobizing agent, due to breakup of the agglomerate by such treatment, at least several times more treated silica flies out of the fluidization vessel together with waste gases than when agglomerated silica is directly deacidified. The presence of such fugitive treated silica in the waste gases leads to a number of practical obstacles when the waste gases are treated with a scrubber, such as the formation of foam, which cannot be easily removed with filters.

SUMMARY OF THE INVENTION

It is therefore an object of the invention to provide a method and apparatus for producing hydrophobic silica fine powder by hydrophobizing agglomerated silica with an organohalosilane in a fluidization vessel, which are designed such that a part of the treated silica which flies out of the vessel together with waste gases can be reliably recovered without complicating the apparatus or process control.

In studies where we installed cyclones and bag filters to recover silica that had flown out from fluidization vessels and examined the degree of fly-out based on the amount of silica recovered, we found the fly-out ratio to be 0.3 to 0.5% when conventional pyrogenic silica is deacidified in a fluidization vessel, and 4 to 15% when such silica is first treated with a hydrophobizing agent then deacidified. While the shape of the equipment and the fluidizing conditions also have an effect on the fly-out ratio, this large difference appears to be attributable to the breakup of agglomerates in hydrophobizing treatment, which leads to easier fly-out than when the silica is subjected only to deacidification. Recovery of the fugitive silica is thus necessary to improve product yield and alleviate the burden on waste gas treatment.

However, unreacted organohalosilane (referred to hereinafter as "silane") hydrophobizing agent present in the waste gases forms a gel or oil due to the condensation of moisture in the waste gases, which can lead to the clogging and obstruction of equipment and lines. On measuring and studying the temperature at various places in the exhaust system, we have found that, if the temperature of the equipment and waste gases is maintained at 100° C. or higher, the moisture present in the waste gases does not condense and undesirable products such as gels or oils due to moisture and unreacted silane do not form. In particular, the absence of gel or oil formation on the filter fabric in a bag filter keeps the filter fabric free of clogging, making it possible to carry out continuous operation.

The degree of fly-out also varies with the flow conditions. In hydrophobizing treatment, a high concentration of chlorine is generally present in the gas, creating a need for subsequent deacidification. However, it is more effective to carry out hydrophobizing treatment and deacidification separately, in which case the presence or absence of moisture comes to have an effect on flow of the material during deacidification. An investigation on the level of water showed us that material fluidization is poor in the absence of moisture, but that the addition of even a very small amount of water to the fluidizing gas improves the flow state and reduces fly-out. Less fly-out makes it possible to lower the burden on cyclones and especially bag filters.

We thus discovered that by holding down fly-out and maintaining the temperature of the cyclone and bag filter at 100° C. or higher, essentially 100% of fugitive silica can be recovered.

Accordingly, the invention provides a method for producing hydrophobic silica fine powder. A silane compound is pyrolyzed to form a silica fine powder. The silica fine powder is then hydrophobized with an organohalosilane in a fluidization vessel, giving hydrophobized silica fine powder which is collected. The hydrophobized silica fine powder which flies out of the fluidization vessel is collected with a cyclone and bag filter which are held at a temperature of 100 to 500° C.

In a preferred embodiment, the fluidization vessel includes a hydrophobizing section where the silica fine powder is hydrophobized and a deacidifying section where deacidification is carried out following hydrophobization. Deacidification is preferably carried out in the deacidifying section by adding 0.1 to 1 vol % of water to a fluidizing gas.

The invention also provides an apparatus for producing hydrophobic silica fine powder, which apparatus includes a means for pyrolyzing a silane compound to form silica fine powder, a means for agglomerating the silica fine powder, a first cyclone and a first bag filter for collecting the agglomerated silica fine powder, a fluidization vessel having a hydrophobizing section for hydrophobizing the collected silica fine powder, and a second cyclone and a second bag filter for collecting the hydrophobic silica fine powder which flies out of the fluidization vessel. The second cyclone and the second filter can each be held at a temperature of 100 to 500° C.

The advantages of the invention are as follows. When silane is flame-hydrolyzed to form silica fine powder, and the silica is then hydrophobized in a fluidization vessel using a hydrophobizing agent such as an organohalosilane, the amount of silica that flies out of the vessel into the waste gases is greater than when hydrophobizing treatment is not carried out. During recovery of the silica in the waste gases, the condensation of moisture in the waste gases converts unreacted organohalosilane hydrophobizing agent which emerges together with the waste gases into an undesirable gel or oil. In the method and apparatus of the invention, by maintaining the cyclone and bag filter used as the recovery devices at a temperature of at least 100° C., no organohalosilane gel or oil forms and thus no clogging of lines or bag filter pores occurs, making continuous operation possible. Moreover, the inventive method and apparatus enable essentially 100% recovery of fugitive silica, resulting in a higher product yield. An additional advantage is that, even when the waste gases are treated with a scrubber, there is little if any fugitive silica-induced formation of foam, which cannot be easily removed with filters. This greatly alleviates the burden on waste gas and wastewater treatment.

BRIEF DESCRIPTION OF THE DRAWINGS

The objects, features and advantages of the invention will become more apparent from the following detailed description, taken in conjunction with the accompanying drawings.

DETAILED DESCRIPTION OF THE INVENTION

The inventive process for producing hydrophobic silica fine powder involves pyrolyzing a silane compound (a halogenated silicon compound) to form a silicon dioxide fine powder (pyrogenic silica), then treating the pyrogenic silica in a fluidization vessel with a hydrophobizing agent, more specifically an organohalosilane.

The pyrogenic silica may be prepared by a known process using a halogenated silicon compound such as methyltrichlorosilane. A silica powder having a BET specific surface area of 50 to 400 $m^2/g$ is desirable in terms of flowability and other characteristics.

After pyrogenic silica is prepared by a known method from a halogenated silicon compound, it is preferably agglomerated and halogen gases such as chlorine are separated off and removed. Thereafter, the agglomerated silica is hydrophobized in a fluidization vessel using an organohalosilane as the hydrophobizing agent and using also steam and an inert gas. In a preferred embodiment, the fluidization vessel is divided into a hydrophobizing section and a deacidifying section. Hydrophobization of the pyrogenic silica is carried out in the hydrophobizing section, followed by deacidification in the deacidifying section.

In the practice of the invention, a part of the hydrophobized silica fine powder which flies out of the fluidization vessel (including both the hydrophobizing section and the deacidifying section) is collected with a cyclone and bag filter held at temperatures within a range of 100 to 500° C. The collected powder is returned to the fluidization vessel, and in particular the deacidifying section. In the deacidifying section, adding 0.1 to 1 vol % of water to the fluidizing gas is preferable for promoting fluidization and deacidification.

In one preferred embodiment, production and recovery of hydrophobized silica fine powder is carried out as a continuous process within an apparatus that includes a pyrogenic silica-producing operation. However, this is not an essential feature of the invention.

Figure 1:
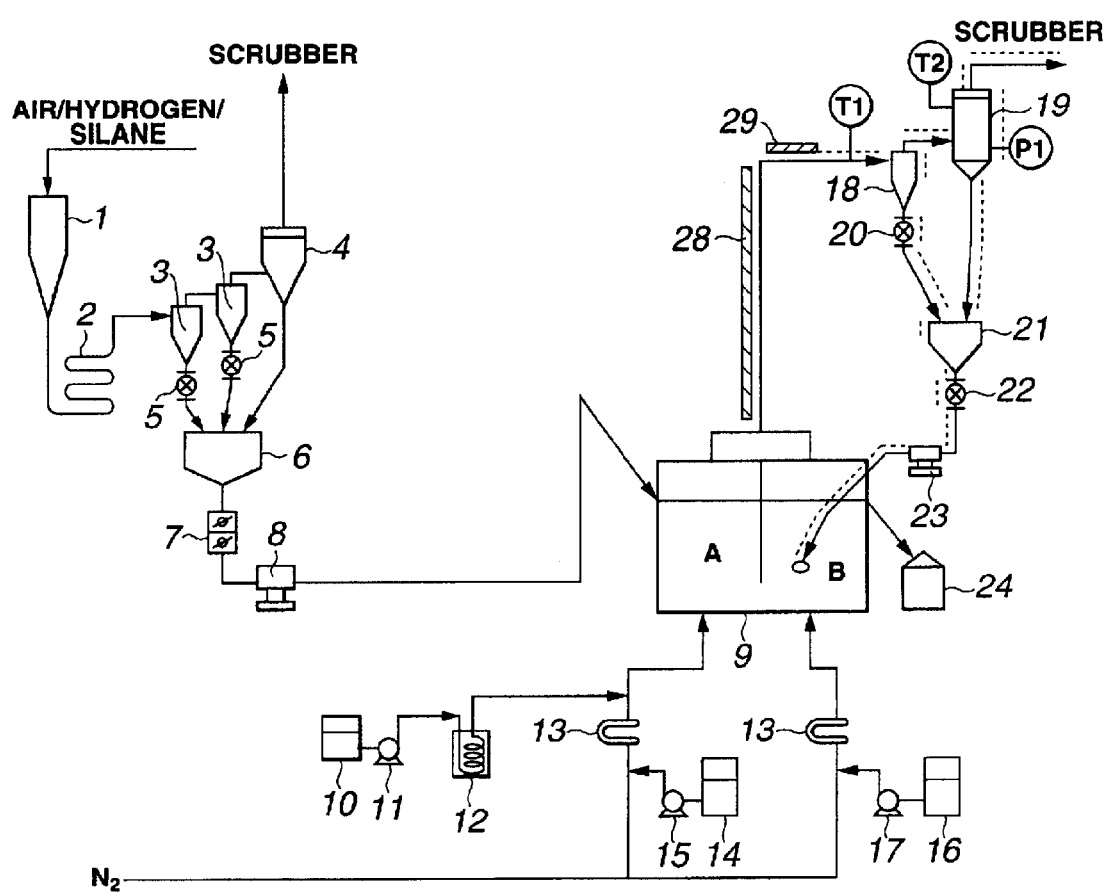
FIG. 1 is a flow diagram illustrating an embodiment of the invention.

Referring to FIG. 1, a preferred embodiment of the invention is described below. Pyrogenic silica is produced according to a conventional process by burning a halogenated silicon compound together with hydrogen and air in a combustion chamber (pyrolyzing means) 1 and agglomerated by an agglomerator (agglomerating means) 2 for subsequent collection by cyclones 3 and a bag filter 4. Use of the cyclones 3 and bag filter 4 also serves to separate off chlorine and other halogen-containing gases that form as by-products in the combustion chamber 1. The separated halogen-containing gases are sent to a scrubber. The agglomerated silica then passes through rotary valves 5 and is collected in a hopper 6. Agglomerated silica that has been retrieved by the bag filter 4 also is recovered in the hopper 6.

Next, the agglomerated silica passes through a double damper 7, and is delivered by a diaphragm pump 8 to a fluidization vessel 9 for hydrophobization.

The fluidization vessel 9 is divided into a hydrophobizing section A and a deacidifying section B. In the apparatus depicted in FIG. 1, the hydrophobizing section A and the deacidifying section B communicate in the lower portion of the fluidization vessel 9. Silica hydrophobization is carried out in hydrophobizing section A, and the halogen gas such as chlorine which accompanies the silica from the hydrophobizing section A is removed in the deacidifying section B. Alternatively, hydrophobization and deacidification may be carried out in separate devices.

In the hydrophobizing section A, the silica is fluidized with an inert gas, generally nitrogen ($N_2$), and is treated with a hydrophobizing agent. In the apparatus shown in FIG. 1, the hydrophobizing agent 10 is sent by a pump 11 through a vaporizer 12 and to the fluidization vessel 9. The hydrophobizing agent 10 may be mixed with the silica before the silica enters the fluidization vessel 9. An alternative is to heat fluidizing nitrogen having water entrained thereon, then mix the hydrophobizing agent into the gas stream and introduce the resulting mixture into the fluidization vessel 9.

The silica is hydrophobized at a temperature of preferably 400 to 600° C., and most preferably 450 to 550° C. The flow velocity is preferably from 1 to 6 cm/s, although a velocity within a range of 1.4 to 3 cm/s is especially preferred for achieving a stable fluidized state and holding down the fly-out of silica. Water is used at this point because it has a beneficial effect on hydrophobizing treatment. The water 14 is fed with a pump 15 to the fluidizing inert gas, following which the gas is heated with a heater 13 and introduced to the hydrophobizing section A of the fluidization vessel 9. The amount of water used for hydrophobization is preferably 0.1 to 5 parts by weight, and most preferably 0.5 to 3 parts by weight, per 100 parts by weight of silica. The hydrophobizing agent is an organo-halosilane, and most preferably dimethyldichlorosilane.

In the deacidifying section B, the silica is fluidized with an inert gas, typically nitrogen, and subjected to deacidification. Water is typically added to the fluidizing gas so that deacidification can be carried out in a water-containing atmosphere. Preferably, as shown in FIG. 1, the water 16 is added to the fluidizing gas with a pump 17, following which the gas is heated with a heater 13 and introduced to the deacidifying section B. The amount of water added to the fluidizing gas for this purpose is preferably at least 0.1 vol %, and most preferably 0.1 to 1 vol %. In the absence of moisture, the silica may become less flowable, making it necessary to use more fluidizing gas, which in turn results in increased fly-out. This is particularly undesirable from the standpoint of the burden on the bag filter. On the other hand, too much moisture may give rise to such undesirable effects as condensation when the deacidified silica is recovered in a recovery vessel 24 from the deacidifying section B.

The deacidification temperature is preferably 400 to 500° C., and the flow velocity is preferably 1 to 6 cm/s.

Waste gases from the fluidization vessel 9 (including both hydrophobizing section A and deacidifying section B) are sent to a scrubber via a cyclone 18 and a bag filter 19. Silica accompanying the waste gases passes from the cyclone 18 to a rotary valve 20 or is trapped by the bag filter 19, then is collected in a hopper 21, following which it is returned to the deacidifying section B via a rotary valve 22 and a diaphragm pump 23. The deacidified silica is collected in the recovery vessel 24.

The silica that flew out of the fluidization vessel 9 together with the waste gases was collected and the physical properties examined. Treatment appeared sufficient in terms of the carbon content, but the pH was 3.7 to 4.1, indicating a need to again deacidify the collected silica. Hence, the silica collected by the cyclone 18 and bag filter 19 are fed by a diaphragm pump 23 to the center of the deacidifying section B of the fluidization vessel 9. Unreacted silane accompanies the waste gases. The condensation of moisture accompanying the waste gases on the walls of the apparatus at temperatures below 100° C. converts the silane into a gel or oil, which obstructs pipelines and in particular clogs the pores of the filter fabric used in the bag filter 19. Accordingly, it is necessary to maintain the interior of the system at a temperature of at least 100° C. In FIG. 1, T1 and T2 are each thermometers which measure the temperature of the waste gases. The temperature readings at T1 and T2 must be at least 100° C., although a higher temperature, such as 130° C. or more, is preferred at the bag filter, both for the gases themselves and also for areas of the bag filter that come into direct contact with the gases. Accordingly, the interior of the exhaust system must be held at a temperature within a range of 100 to 500° C. and, for reasons associated in part with the choice of filter fabric and bag filter, preferably in a range of 130 to 200° C. The formation of gummy or oily deposits on the filter fabric of the bag filter 19 causes the pressure difference to rise, making normal operation difficult. It is thus desirable to install a differential pressure gauge P1 on the bag filter 19 to monitor changes in the pressure difference. The production apparatus shown in FIG. 1 is also provided with a heat insulator 28 and a steam tracer 29 to keep the temperature from falling.

The properties of the hydrophobic silica produced by the treatment method and apparatus of the invention are not subject to any particular limitation, although a specific surface area of about 110 m$^2$/g, a carbon content of at least about 0.9 wt %, and a pH of at least 4.5 are preferred. Hydrophobic silica having such properties is highly suitable for use in sealants and related applications.

EXAMPLE

The following examples are provided to illustrate the invention, and are not intended to limit the scope thereof.

Example 1

The apparatus shown in FIG. 1 was operated continuously for a total of 500 hours. During operation, 50.3 kg/h of methyltrichlorosilane was burned together with hydrogen and air, producing 20.1 kg/h of silica. The resulting silica was subjected to hydrophobizing treatment at a nitrogen feed rate of 30 Nm$^3$/h, a dimethyldichlorosilane feed rate of 2.0 kg/h, and a water feed rate of 0.5 kg/h into section A of the fluidization vessel 9, and a temperature of 490° C. The flow velocity of silica into section A was 2.0 cm/s. The hydrophobized silica was then deacidified at a nitrogen feed rate of 35 Nm$^3$/h and a water feed rate of 0.2 kg/h to section B of the fluidization vessel 9, a temperature of 480° C., and a flow velocity of about 2.2 cm/s. The treated silica had, on average, a specific surface area of 114 m$^2$/g, a carbon content of 0.97 wt %, and a pH of 4.7. The temperatures of the cyclone 18 and the bag filter 19 were, on average, 150° C. (T1) and 135° C. (T2). The pressure difference P1 at the bag filter was 0.8 kPa at the start of operation, and 1.4 kPa at the end of operation. The combined amount of silica collected by the cyclone 18 and the bag filter 19 on the discharge side of the diaphragm pump 23 during operation was 0.8 kg/h, representing a fly-out ratio of about 4%. Following the end of operation, the scrubber fluid was almost entirely free of suspended silica. Nor was there any gel or oil deposited on the filter fabric of the bag filter.

In another run, using the apparatus shown in FIG. 1, methyltrichlorosilane was burned to form 20 kg/h of silica, and the silica was treated for 6 hours with dimethyldichlorosilane, whereupon an average of 1.4 kg/h of fugitive silica was recovered at the diaphragm pump 23 outlet. In a further run wherein dimethyldichlorosilane was not supplied and only deacidification was carried out, the amount of fugitive silica recovered was 0.07 kg/h. Each of the above runs was carried out several times, whereupon the fly-out ratio was 0.3 to 0.5% without hydrophobization, and increased considerably to 4 to 15% with hydrophobization.

Example 2

The apparatus shown in FIG. 1 was operated for a period of 7 hours by burning 49.6 kg/h of methyltrichlorosilane together with hydrogen and air, thereby producing 19.8 kg/h of silica. Hydrophobization of the silica was carried out in section A of the fluidization vessel 9 in the same manner as in Example 1. Deacidification was carried out in section B of the fluidization vessel B without feeding water and at a nitrogen feed rate of 45 Nm$^3$/h, a temperature of 480° C., and a flow velocity of about 2.8 cm/s. The treated silica had a specific surface area of 114 m$^2$/g, a carbon content of 0.95 wt %, and a pH of 4.6. The amount of silica collected on the discharge side of the diaphragm pump 23 was 2.4 kg/h. Hence, the fly-out ratio was about 12%.

Example 3

The apparatus shown in FIG. 1 was operated for a period of 7 hours by burning 50.4 kg/h of methyltrichlorosilane with hydrogen and air, thereby producing 20.1 kg/h of silica. Treatment in section A was the same as in Example 1. Aside from feeding 2.0 kg/h of water to section B, treatment in section B was also carried out as in Example 1. The treated silica had a specific surface area of 108 m$^2$/g, a carbon content of 0.95 wt %, and a pH of 4.8. The amount of silica collected on the discharge side of the diaphragm pump 23 was 1.2 kg/h, indicating a fly-out ratio of about 6%. Condensation was observed in the silica recovery vessel 24 on the outlet side of the fluidization vessel 9.

Comparative Example 1

Figure 2:
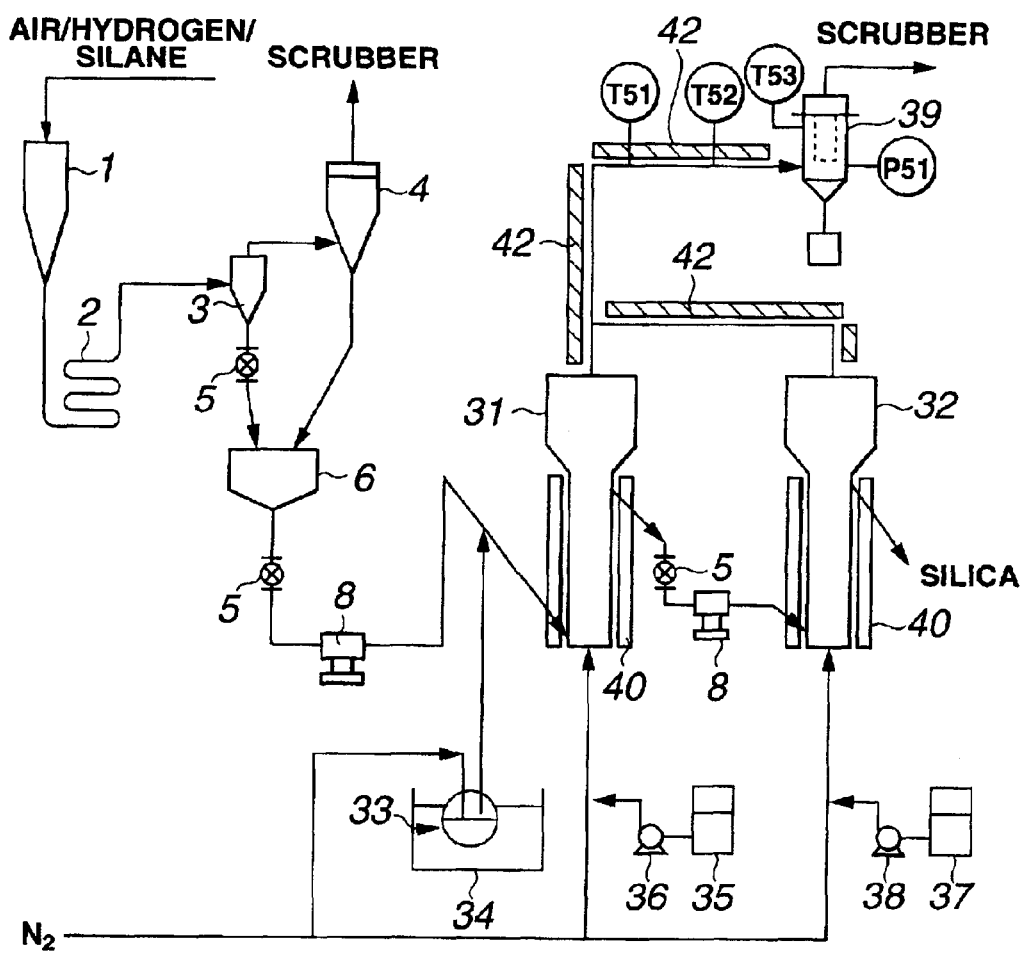
FIG. 2 is a flow diagram illustrating Comparative Example 1 described below.

The apparatus shown in FIG. 2 was used. Referring to FIG. 2, the apparatus included fluidization vessels 31 and 32, a hydrophobizing agent container 33, a constant-temperature vessel 34, water tanks 35 and 37, pumps 36 and 38, a bag filter 39, a heater 40 and a heat insulator 42. Other parts serving the same purposes as parts in FIG. 1 are designated by the same reference numerals. The apparatus also includes thermometers T51, T52 and T53, and a differential pressure gauge P51.

About 3 kg/h of methyltrichlorosilane was burned with hydrogen and air, yielding about 1.2 kg/h of silica. Hydrophobization was carried out at a temperature of 500° C. in fluidization vessels 31 and 32, a dimethyldichlorosilane feed rate of 0.12 kg/h, a water feed rate to the fluidization vessel 31 of 0.03 kg/h, and a water feed rate to the fluidization vessel 32 of 1 part by volume per 100 parts by volume of the fluidizing gas. The flow velocity was about 2.7 cm/s. The treated silica had a specific surface area of 115 m$^2$/g, a carbon content of 0.92 wt %, and a pH of 4.5. The average temperatures were 110° C. at T51, 90° C. at T52, and 75° C. at T53. The reading on the differential pressure gauge P51 at the bag filter was 0.7 kPa at the start of operation. However, this rose to 2.8 kPa, and so operation was stopped after a total of 40 hours. After the end of operation, the filter fabric at the bag filter had an oily and tacky feel. No oil or gel deposits were found on the walls of the pipeline at T51, but considerable deposits were noted at T52.

As demonstrated in the foregoing examples, the inventive method and apparatus use a cyclone and a bag filter to recover silica that flies out of the fluidization vessel. Under simple controlled conditions that involve holding these devices at temperatures of at least 100° C., essentially 100% of the fugitive silica can be recovered, resulting in increased yield of the product and reducing the burden on waste gas treatment.

Japanese Patent Application No. 2000-262219 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for producing hydrophobic silica fine powder, comprising the steps of pyrolyzing a silane compound to form a silica fine powder and hydrophobizing the silica fine powder with an organohalosilane in a fluidization vessel; wherein hydrophobized silica fine powder which flies out of the fluidization vessel is collected with a cyclone and bag filter held at a temperature of 100 to 500° C.

2. The method of claim 1 in which the fluidization vessel includes a hydrophobizing section where the silica fine powder is hydrophobized and a deacidifying section where deacidification is carried out following hydrophobization, and deacidification is carried out in the deacidifying section by adding 0.1 to 1 vol % of water to a fluidizing gas.

* * * * *